United States Patent [19]

Ishikawa et al.

[11] Patent Number: 4,818,809

[45] Date of Patent: Apr. 4, 1989

[54] AROMATIC SULFIDE AMIDE POLYMER AND A PROCESS FOR THE PRODUCTION THEREOF

[75] Inventors: Tomohiro Ishikawa; Yozo Kondo, both of Yokkaichi, Japan

[73] Assignee: Toyo Soda Manufacturing Co., Ltd., Shinnanyo, Japan

[21] Appl. No.: 95,670

[22] Filed: Sep. 14, 1987

[30] Foreign Application Priority Data

Sep. 26, 1986 [JP] Japan .................. 61-226060

[51] Int. Cl.$^4$ .................. C08G 63/68; C08G 75/00
[52] U.S. Cl. .................. 528/364; 528/206; 528/207; 528/208; 528/210; 528/226; 528/337; 528/387; 528/388
[58] Field of Search .............. 528/364, 206, 207, 208, 528/210, 226, 337, 388, 387

[56] References Cited

U.S. PATENT DOCUMENTS 2,706,726  4/1955  Evans et al. .................. 528/364
3,640,965  2/1972  Brode et al. .................. 528/364

*Primary Examiner*—Harold D. Anderson
*Attorney, Agent, or Firm*—Oblon, Fisher, Spivak, McClelland & Maier

[57] ABSTRACT

Aromatic sulfide amide polymers composed of a repeating unit having the formula (I) and a repeating unit having the formula (II) below, having an inherent viscosity ranging from 0.02 to 10 dl/g.

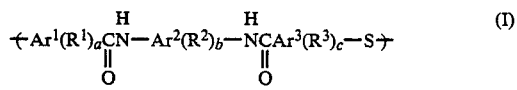

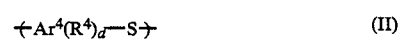

wherein, $Ar^1$, $Ar^2$, $Ar^3$ and $Ar^4$ are same or different aromatic rings and $R^1$, $R^2$, $R^3$ and $R^4$ are groups selected from the group consisting of alkyl groups having 1–20 carbon atoms, cycloalkyl group having 3–20 carbon atoms, aryl groups having 6–20 carbon atoms, alkoxy groups having 1–20 carbon atoms, acyl groups having 2–20 carbon atoms, and aralkyl groups having 7–20 carbon atoms, and the four R's may be the same or different from each other, and a, b, c and d stand for integers from 0–4 and may be the same or different from each other, and the process comprises sulfide forming reaction of an amide group containing dihalogenide expressed by the general formula (III) with an aromatic dihalogenide expressed by the general formula (IV) under the action of a sulfide forming reagent,

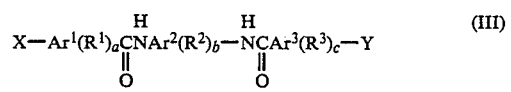

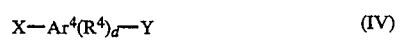

13 Claims, 2 Drawing Sheets

AROMATIC SULFIDE AMIDE POLYMER AND A PROCESS FOR THE PRODUCTION THEREOF

BACKGROUND OF THE INVENTION

1. Field of the Invention

The present invention relates to novel aromatic sulfide amide polymers and a process for the production thereof.

This invention relates to novel polymers in the chemical structure of which phenylene groups are bound with amide and thioether groups inbetween, and which are useful as raw materials for producing molded matters excellent in heat resistance, solvent resistance and the mechanical properties, and a process for producing said polymers in an industrial scale and manner.

2. Description of the Related Arts

So far, a number of polymers, thermosetting and thermoplastic, are known as raw material for producing molded matters of heat resistant resins.

Particularly, whole aromatic heat resistant resins are being developed in many places. The polymers include polyphenyleneterephthalic amides, polyimides, polyether etherketones, and polyphenylene sulfides.

However, these heat resistant polymers generally hold troubles in the molding operation. In addition, their properties do not suffice for the applications where more strict heat resistance is required.

Further defects of these heat resistant polymers are that their monomers are difficult to synthesize, they require special solvents to conduct the polymerization process and their molding is accompanied by a low degree of productivity.

The object of this invention is to provide novel aromatic sulfide amide polymers which are excellent in the heat resistance, solvent resistance and their mechanical properties, and a process for the production thereof.

SUMMARY OF THE INVENTION

The first invention of the present invention is aromatic sulfide amide polymers of which 1–100% by mole of the composing units consist of the repeating unit (1) described below and 99–0% by mole of the composing units consist of the repeating unit (2) described below.

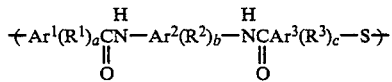

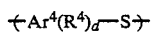

In the formulae above, Ar$^1$, Ar$^2$, Ar$^3$ and Ar$^4$ are aromatic rings and R$^1$, R$^2$, R$^3$ and R$^4$ are groups selected from the group consisting of alkyl groups having 1–20 carbon atoms, cycloalkyl groups having 3–20 carbon atoms, aryl groups having 6–20 carbon atoms, alkoxyl groups having 1–20 carbon atoms, acyl groups having a 2–20 carbon atoms, and aralkyl groups having 7–20 carbon atoms, and the four R's may be the same or different from each other. The subscripts a, b, c and d stand for integers from 0–4 and may be the same or different from each other.

The second invention of the present invention is a process for producing aromatic sulfide amide polymers or copolymers described above by the reaction of a dihalogenide (III) containing amide group with an aromatic dihalogenide (IV) to form sulfide bonds with the aid of a sulfide forming reagent,

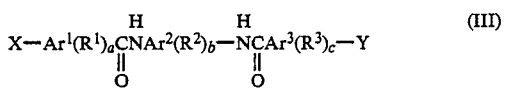

In the formulae above, Ar$^1$, Ar$^2$, Ar$^3$ and Ar$^4$ are aromatic rings and R$^1$, R$^2$, R$^3$ and R$^4$ are groups selected from the group consisting of alkyl groups having 1–20 carbon atoms, cycloalkyl groups having 3–20 carbon atoms, aryl groups having 6–20 carbon atoms, alkoxyl groups having 1–20 carbon atoms, acyl groups having 2–20 carbon atoms, and aralkyl groups having 7–20 carbon atoms, and the four R's may be the same or different from each other. The subscripts a, b, c and d stand for integers from 0–4 and may be the same or different from each other. X and Y are halogens which may be the same or different from each other.

DETAILED DESCRIPTION OF THE INVENTION

The process for synthesizing aromatic polysulfide amide polymers of the invention may include all the processes for synthesizing polyphenylene sulfides. Among them, however, those processes are particularly preferable in which an amide group containing aromatic dihalogen compound expressed by a general formula (III) is reacted with an aromatic dihalogen compound expressed by a general formula (IV) under the action of a sulfide forming reagent in an organic polar solvent.

For the amide group containing aromatic dihalogen compounds to be used in the invention and expressed by the general formula (III), Ar$^1$, Ar$^2$ and Ar$^3$ are, for example,

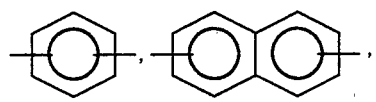

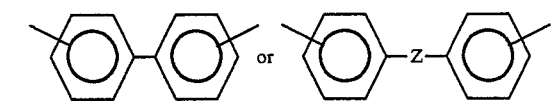

(where Z stands for —O—, —S—, —SO$_2$—, —CO—,

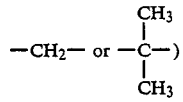

Preferable example are as follows:

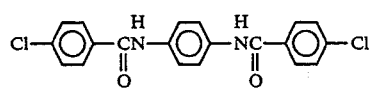

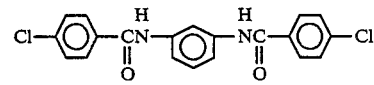

-continued

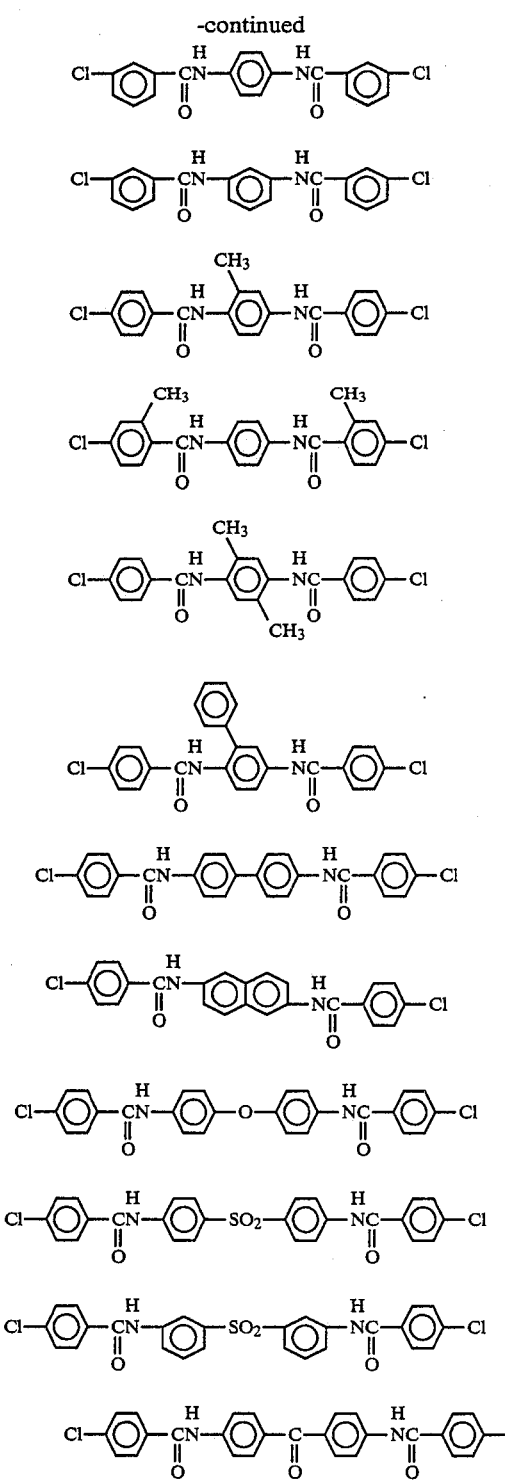

These amide group containing aromatic compounds should preferably have linkage at the para-positions for the sake of high heat resistance, but linkages at the meta- and/or the ortho-positions are also allowed to improve solubility and processability of the aromatic polysulfide amide polymers.

The amide group containing aromatic compounds above may be synthesized by a generally known amide bond forming reaction. For example, the synthesis may be performed by the reaction of an aromatic diamine with a halogen containing aromatic carboxylic acid chloride.

The aromatic dihalogenides (IV) to be employed in this invention include all the aromatic dihalogenides described in Japanese Patent Publication No. Sho 45-3368. Preferable among them are dichlorobenzene, dichlorobenzophenone and dichlorodiphenylsulfon.

Organic polar solvents are preferably selected from those solvents which are aprotic and stable to alkalis at higher temperatures. They are, for example, N,N-dimethylacetamide, N-ethyl-2-pyrrolidone, hexamethylphosphoramide, dimethylsulfoxide, N-methyl-2-pyrrolidone (NMP), and 1,3-dimethylimidazolidinone.

The sulfide forming reagents to be used in this invention may include an alkali metal sulfide, an alkali metal hydrosulfide and an alkali metal base, and hydrogen sulfide and an alkali metal base. The sulfides and hydrosulfides of alkali metal may be used in the form of a hydrate.

The sulfide forming reagents may be either prepared in the reaction vessel or added from outside before adding the dihalogenides of the general formulae (III) and (IV) to the polymerization system. Prior to the addition of the dihalogenides (III) and (IV) for polymerization, water content of the system should be preferably reduced, for instance by distillation, to less than 2.5 equivalents per mole of the sulfide forming reagent. Reagents for the sulfide formation are preferably selected from the group consisting of sodium sulfide and combinations of hydrosulfide with sodium hydroxide and hydrogen sulfide with sodium hydroxide.

Various compounds are known to effectively improve molecular weight of the polymer obtained when they are added in the polymerization stage, such as crown ether compounds known as phase transfer catalyst, phosphorous salts, ammonium salts, and alkali metal carboxylates.

The polymerization is carried out under stirring at a temperature 150°–300° C., preferably 180°–280° C., for 0.5–24 hours, preferably 1–12 hours.

The ratio of the amide group containing compound expressed by the general formula (III) to a sulfide forming reagent is preferably (0.9–1.1):1. The amount of solvent should be adjusted so that the polymer produced by the polymerization process amounts to 7–50%, preferably 10–40%, by weight of the total system.

Conventional methods of recovery may be applied to the polymer obtained. Thus, the polymer may be isolated by distillation at a reduced pressure, flashing, and reprecipitation with water or an organic solvent, and purified by washing with water or an organic solvent, followed by drying.

The aromatic sulfide amide polymers of the invention, when dissolved in NMP/LiCl (in a ratio of 95/5 by weight) at a concentration of 0.1 g/dl, shows an inherent viscosity of about 0.02–10 dl/g at 30° C., where preferable value of the inherent viscosity ranges from about 0.05 to 10 dl/g. In case of a copolymer which is composed of a less amount of the amide group containing unit (I) and does not completely dissolve in said solvent, a solution in chloronaphthalene at 210° C. to a concentration of 0.1 g/dl shows an inherent viscosity of about 0.02–10 dl/g, where, however, an inherent viscosity of about 0.05–10 dl/g is preferable.

The molecular chain of the aromatic polysulfide amide polymers of the invention may be favorably changed to result in an elongated chain, cross linkage or branching by being heated in an oxidative atmosphere such as in air.

The polymers of the invention may be mixed with various known filler components when they are treated for molding operations. Typical examples of the filler components are:
(a) fibrous fillers; glass fiber, carbon fiber, boron fiber, Aramid ® fiber, and alumina fiber.
(b) inorganic fillers; mica, talc, clay, graphite, carbon black, silica, asbestos, molybdenum sulfide, magnesium oxide, and calcium oxide.

The aromatic polysulfide amide polymers of the invention are excellent in the heat resistance and the molding processability and therefore useful as raw material for making a variety of molded parts, films, fibers and coating materials.

BRIEF EXPLANATION OF THE INVENTION

DESCRIPTION OF THE PREFERRED EMBODIMENTS

Figure 1:
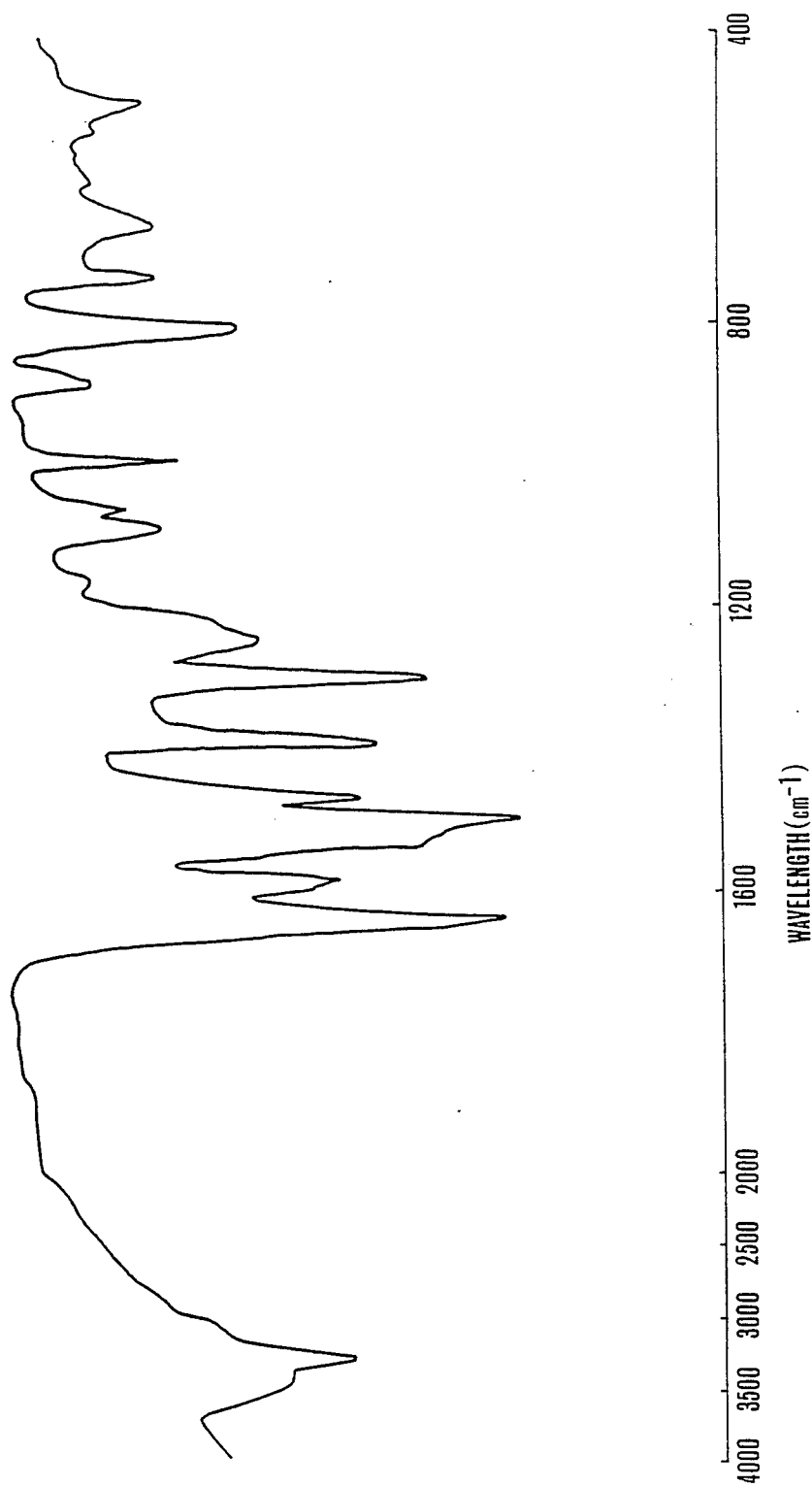
FIG. 1 is a diagram for an infrared absorption spectrum of the polymer obtained in Example 1.
Figure 2:
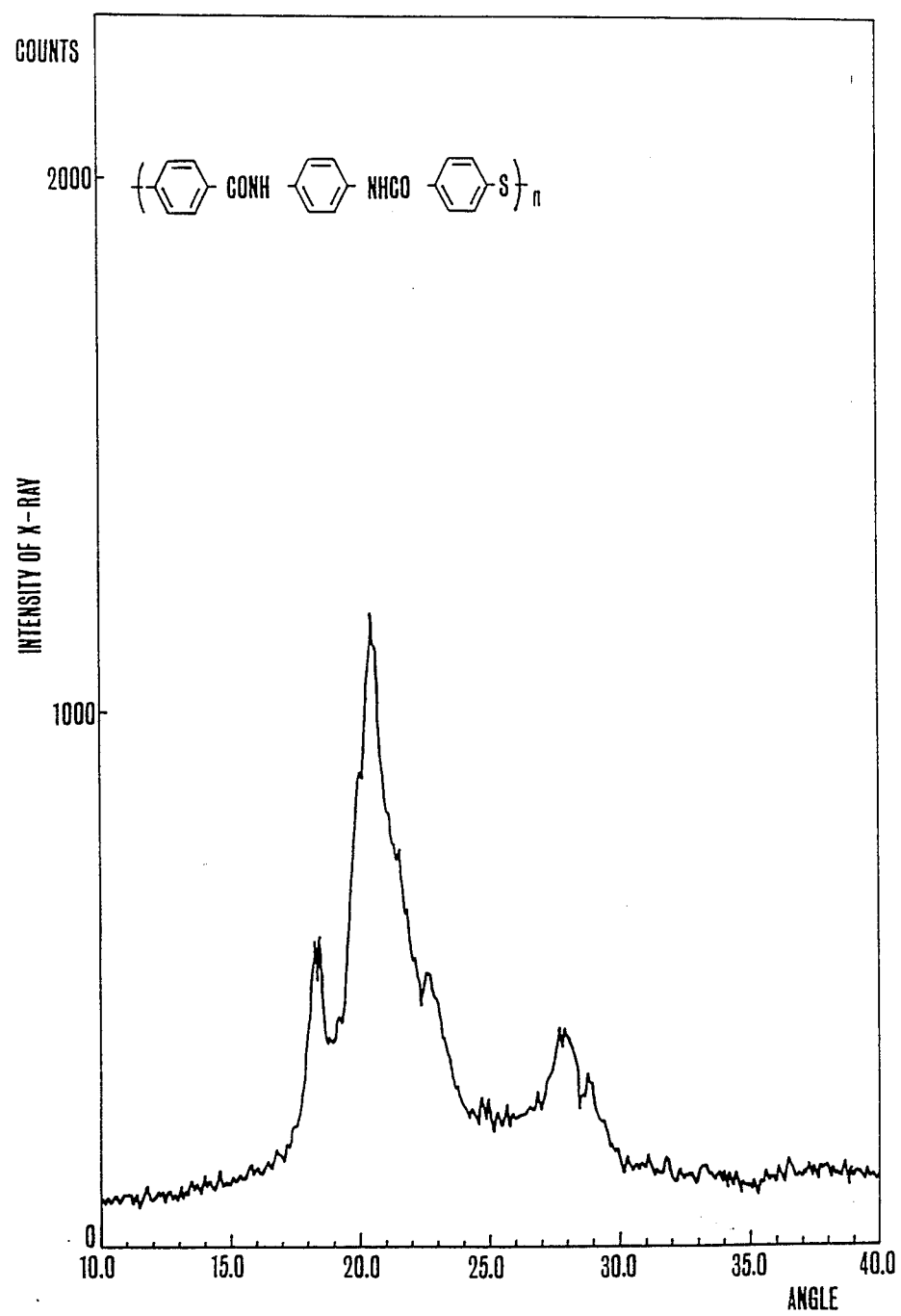
FIG. 2 is an X-ray diffraction of the polymer obtained of Example 1.

The invention will be more particularly explained using some examples below.

EXAMPLE 1

In an autoclave of 2 liter capacity placed were 0.6 mol of Na$_2$S 2.9H$_2$O and 600 ml of N-methyl-2-pyrrolidone (NMP) and the mixture was agitated under a stream of nitrogen. The temperature was elevated up to 210° C. for dehydration and obtained 24.2 g of a distilled liquid mainly of water. The reaction system was then cooled to 120° C. and 0.6 mol of

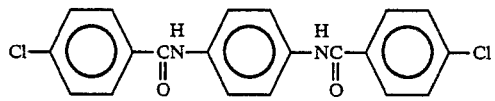

was added together with 80 ml of N-methyl-2-pyrrolidone, the whole was sealed in an atmosphere of nitrogen and the temperature was elevated. Thus, the polymerization was conducted for 6 hours at 240° C. When the reaction was completed, the reaction system was cooled, the content was poured into water, repeatedly washed with water and filtered. After final washing with methanol and drying, 192 g of a light gray powdery polymer was obtained with a yield of 92%.

The polymer showed an inherent viscosity of 0.37 dl/g (NMP/LiCl; 95/5 by weight, 0.1 g/dl at 30° C.).

The polymer could not be melt-molded, but it was soluble in concentrated sulfuric acid and NMP/LiCl and lustrous films of amber color could be produced by casting the solutions.

An infrared absorption (IR) spectrum of this polymer manifested an absorption due to a thioether bond at 1070 cm$^{-1}$ and absorptions due to amide group at 3270, 1640 and 1505 cm$^{-1}$.

In addition, the elemental analysis well agreed with the calculated values as shown below.

TABLE 1

| | Elemental Analysis | | | |
|---|---|---|---|---|
| | C | H | N | S |
| Found (% by weight) | 69.0 | 3.9 | 7.9 | 9.1 |
| Calcd. (% by weight) | 69.3 | 4.1 | 8.1 | 9.3 |

Further the sulfide amide polymers decomposed at 489° C., while melting was not be observed.

EXAMPLE 2

Using the starting materials of the following formulation, polymerization was conducted with the same apparatus and the same process as in Example 1.

| | |
|---|---|
| Na$_2$S.9H$_2$O | 0.6 mol |
| NMP | 680 ml |
| Cl—⟨⟩—CNH—⟨⟩—NHC—⟨⟩—Cl | 0.45 mol |
| p-Dichlorobenzene | 0.15 mol |

The polymer was obtained in an amount of 162 g with a yield of 94%. The inherent viscosity was 0.45 dl/g (NMP/LiCl; 95/5 by weight, 0.1 g/dl at 30° C.). The polymer decomposed at 472° C. and a small endothermic peak was observed at 246° C. Lustrous films of amber color could be produced by the compression molding of this polymer at 380° C.

IR spectrum: 3270, 1640, 1505 cm$^{-1}$ (assigned to amide group) 1070 cm$^{-1}$ (assigned to thioether)

TABLE 2

| | Elemental Analysis | | | |
|---|---|---|---|---|
| | C | H | N | S |
| Found (% by weight) | 68.8 | 3.9 | 7.1 | 11.1 |
| Calcd. (% by weight) | 69.1 | 4.0 | 7.3 | 11.2 |

EXAMPLE 3

Polymerization was conducted with the following formulation of starting materials using the same apparatus and the same process as in Example 1.

| | |
|---|---|
| Na$_2$S.9H$_2$O | 0.6 mol |
| NMP | 680 ml |
| Cl—⟨⟩—CNH—⟨⟩—NHC—⟨⟩—Cl | 0.3 mol |
| p-Dichlorobenzene | 0.3 mol |

The polymer in an amount of 127 g was obtained with a yield of 94%. The inherent viscosity was 0.43 dl/g (NMP/LiCl; 95/5 by weight, 0.1 g/dl at 30° C.). The polymer decomposed at 493° C. and a small endothermic peak was observed at 267° C.

IR spectrum: 3250, 1635, 1505 cm$^{-1}$ (assigned to amide group) 1070 cm$^{-1}$ (assigned to thioether)

TABLE 3

| | Elemental Analysis | | | |
|---|---|---|---|---|
| | C | H | N | S |
| Found (% by weight) | 68.6 | 3.9 | 6.0 | 13.9 |

TABLE 3-continued

| | Elemental Analysis | | | |
|---|---|---|---|---|
| | C | H | N | S |
| Calcd. (% by weight) | 68.7 | 4.0 | 6.2 | 14.1 |

EXAMPLE 4

Polymerization was conducted using the following formulation of starting materials with the same apparatus and the same process as in Example 1.

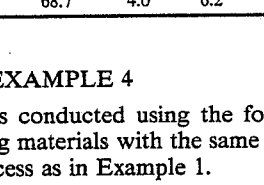

The polymer obtained amounted to 82 g with a yield of 92%. The inherent viscosity was 0.19 dl/g (0.1 g/dl of chloronaphthalene at 210° C.). This substance decomposed at 488° C. and the melting point was 272° C.

IR spectrum: 3260, 1640, 1505 cm$^{-1}$ (assigned to amide group) 1070 cm$^{-1}$ (assigned to thioether)

TABLE 4

| | Elemental Analysis | | | |
|---|---|---|---|---|
| | C | H | N | S |
| Found (% by weight) | 67.5 | 3.8 | 3.1 | 21.5 |
| Calcd. (% by weight) | 67.7 | 3.9 | 3.2 | 21.7 |

EXAMPLE 5

Polymerization was conducted with the following starting materials using the same apparatus and the same process as in Example 1.

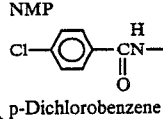

Since the polymer fairly dissolves in NMP, the NMP was distilled away under a reduced pressure after completion of the reaction. The residue was repeatedly washed with hot water and filtered, then washed with methanol and dried, to obtain 146 g of the polymer with a yield of 85%.

The inherent viscosity was 0.24 dl/g (NMP/LiCl; 95/5 by weight, 0.1 g/dl at 30° C.). The polymer thermally decomposed at 443° C. and a small endothermic peak was observed at 217° C.

IR spectrum: 3270, 1640, 1510 cm$^{-1}$ (assigned to amide group) 1070 cm$^{-1}$ (assigned to thioether)

TABLE 5

| | Elemental Analysis | | | |
|---|---|---|---|---|
| | C | H | N | S |
| Found (% by weight) | 68.7 | 3.8 | 7.0 | 10.9 |
| Calcd. (% by weight) | 69.1 | 4.0 | 7.3 | 11.2 |

The polymer obtained was more soluble than the copolymer in Example 2 which contained dihalogenides comprising para-combined amide groups.

Thus, the present invention provides novel aromatic polysulfide polymers having amide groups in which the heat resistance and the mold property are well balanced.

EXAMPLES 6 TO 9

Polymerization was conducted using the same materials shown in Table 6 with the same apparatus and method as in Example 1.

TABLE 6

| Example | Amide Group Containing Dihalogenide (mol) | Sulfide Forming Reagent (mol) | Solvent (ml) |
|---|---|---|---|
| 6 | 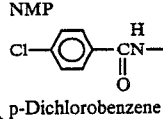<br>0.04 | Na$_2$S.2H$_2$O<br><br>0.04 | NMP<br><br>200 |
| 7 | 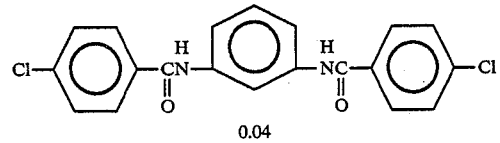<br>0.04 | Na$_2$S.2H$_2$O<br><br>0.04 | NMP<br><br>200 |
| 8 | 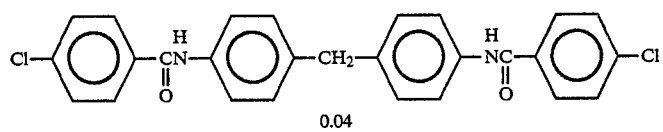<br>0.04 | Na$_2$S.2H$_2$O<br><br>0.04 | NMP<br><br>200 |

TABLE 6-continued

| Example | Amide Group Containing Dihalogenide (mol) | Sulfide Forming Reagent (mol) | Solvent (ml) |
|---|---|---|---|
| 9 | 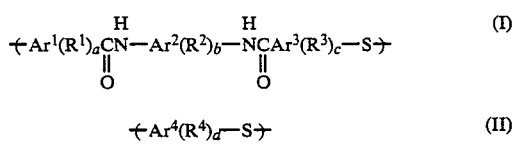 0.04 | Na₂S.2.9H₂O 0.04 | NMP 200 |

Polymerization results and properties of the resultant polymers are shown in Table 7.

TABLE 7

| Example | Yield (%) | Inherent Viscosity (dl/g) | Thermal Decomposition Temperature (°C.) | Elemental Analysis (% by weight) | | | | |
|---|---|---|---|---|---|---|---|---|
| | | | | | C | H | N | S |
| 6 | 74 | 0.17 | 377 | Found | 68.9 | 3.8 | 7.9 | 9.0 |
| | | | | Calcd. | 69.3 | 4.1 | 8.1 | 9.3 |
| 7 | 79 | 0.15 | 511 | Found | 73.8 | 4.3 | 6.1 | 7.0 |
| | | | | Calcd. | 74.3 | 4.6 | 6.4 | 7.3 |
| 8 | 87 | 0.24 | 505 | Found | 71.0 | 3.9 | 6.2 | 7.1 |
| | | | | Calcd. | 71.2 | 4.1 | 6.4 | 7.3 |
| 9 | 96 | 0.19 | 470 | Found | 72.3 | 3.7 | 6.9 | 7.9 |
| | | | | Calcd. | 72.7 | 4.1 | 7.1 | 8.1 |

What is claimed is:

1. Aromatic sulfide amide polymer, of which 1-100% by mole of the composing units consists of a repeating unit having the formula (I) below and 99-0% by mole of the composing units consists of a repeating unit having the formula (II) below, having an inherent viscosity ranging from 0.02 to 10 dl/g when measured in a N-methyl-2-pyrrolidone/lithium chloride, in a ratio of 95/5 by weight, solvent in a concentration of 0.1 g/dl at 30° C. or when measured in a chloronaphthalene solvent in a concentration of 0.1 g/dl at 210° C., $$\underset{O}{\underset{\parallel}{+Ar^1(R^1)_aC}}\underset{H}{\overset{H}{N}}-Ar^2(R^2)_b-\underset{O}{\underset{\parallel}{N}}\underset{C}{\overset{H}{C}}Ar^3(R^3)_c-S\underset{}{+} \quad (I)$$

$$+Ar^4(R^4)_d-S+ \quad (II)$$

wherein, Ar¹, Ar², Ar³ and Ar⁴ are the same or different aromatic rings and R¹, R², R³ and R⁴ are groups selected from the group consisting of alkyl groups having 1-20 carbon atoms, cycloalkyl groups having 3-20 carbon atoms, aryl groups having 6-20 carbon atoms, alkoxy groups having 1-20 carbon atoms, acyl groups having 2-20 carbon atoms, and aralkyl groups having 7-20 carbon atoms, and the four R's are the same or different from each other, and a, b, c and d represent integers from 0-4 and are the same or different from each other.

2. Aromatic sulfide amide polymer according to claim 1, wherein Ar¹, Ar², Ar³ are the same or different aromatic rings selected from

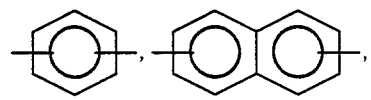

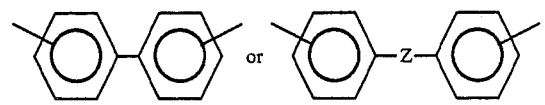

-continued

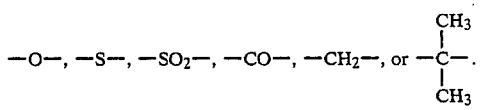

wherein Z represents $$-O-, -S-, -SO_2-, -CO-, -CH_2-, \text{ or } -\underset{CH_3}{\overset{CH_3}{\underset{|}{C}}}-.$$

3. A process for producing aromatic sulfide amide polymers or copolymers composed of the repeating units expressed by the following general formula,

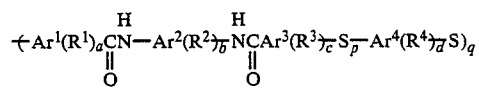

comprising reacting an amide group containing dihalogenide having the general formula (III) with an aromatic dihalogenide having the general formula (IV) with a sulfide forming reagent,

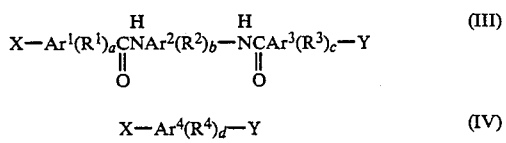

$$X-Ar^4(R^4)_d-Y \quad (IV)$$

where, in the formulae above, Ar¹, Ar², Ar³ and Ar⁴ are aromatic rings and R¹, R², R³ and R⁴ are groups selected from the group consisting of alkyl groups having 1-20 carbon atoms, cycloalkyl groups having 3-20 carbon atoms, aryl groups having 6-20 carbon atoms, alkoxyl groups having 1-20 carbon atoms, acyl groups having 2-20 carbon atoms, and aralkyl groups having 7-20 carbon atoms, and the four R's are the same or different from each other, a, b, c and d represent integers 0-4 and are the same or different from each other, X and Y are halogens which are the same or different atoms from each other, with a ratio of p/q being in the range from 100/0 to 1/99.

4. A process according to claim 3, wherein the aromatic dihalogenide (IV) is selected from the group consisting of dichlorobenzene, dichlorobenzophenone and dichlorodiphenylsulfon.

5. A process according to claim 3, wherein the reacting is performed in an organic polar solvent.

6. The process of claim 3, wherein said sulfide-forming reagent is selected from the group consisting of (i)

alkali metal sulfides, (ii) alkali metal hydrosulfides and alkali metal bases, and (iii) hydrogen sulfide and alkali metal bases.

7. The process of claim 6, wherein said sulfide-forming reagent is selected from the group consisting of (i) sodium sulfide, (ii) alkali metal hydrosulfides and sodium hydroxide, and (iii) hydrogen sulfide and sodium hydroxide.

8. The process of claim 3, wherein said reacting is carried out at a temperature of from 150° to 300° C.

9. The process of claim 8, wherein said reacting is carried out at a temperature of from 100° to 280° C.

10. The process of claim 3, wherein said reacting is carried out for a time of from 0.5 to 24 hours.

11. The process of claim 10, wherein said reacting is carried out for a time of from 1 to 12 hours.

12. The process of claim 3, wherein said amide group containing dihalogenide is selected from the group consisting of

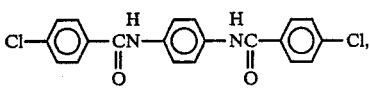

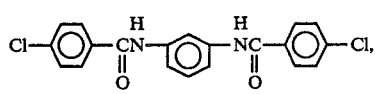

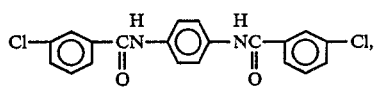

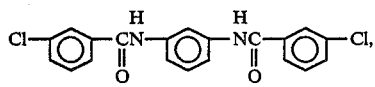

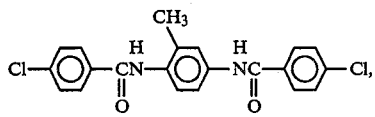

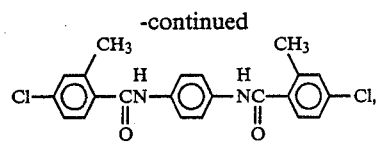

-continued

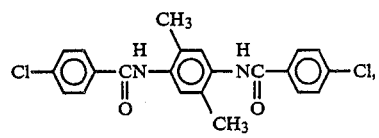

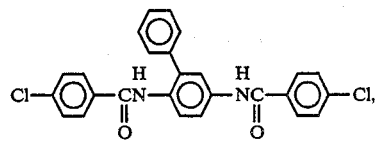

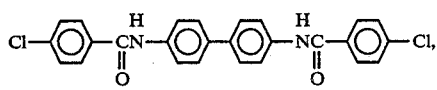

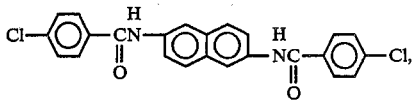

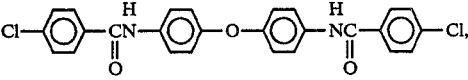

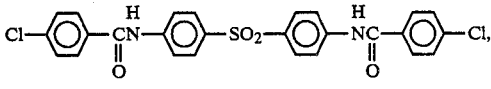

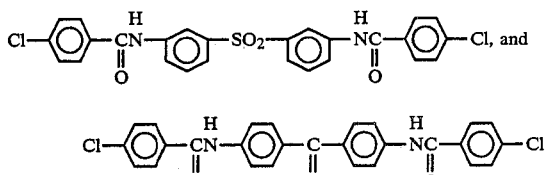

13. The process of claim 5, wherein said organic polar solvent is selected from the group consisting of N,N-dimethylacetamide, N-ethyl-2-pyrrolidone, hexamethylphosphoramide, dimethylsulfoxide, N-methyl-2-pyrrolidone, and 1,3-dimethylimidazolidinone.

* * * * *